Dec. 12, 1967   N. O. SUNDBERG   3,357,513
CONTROL MEANS FOR VEHICLES
Filed Sept. 23, 1965   9 Sheets-Sheet 5
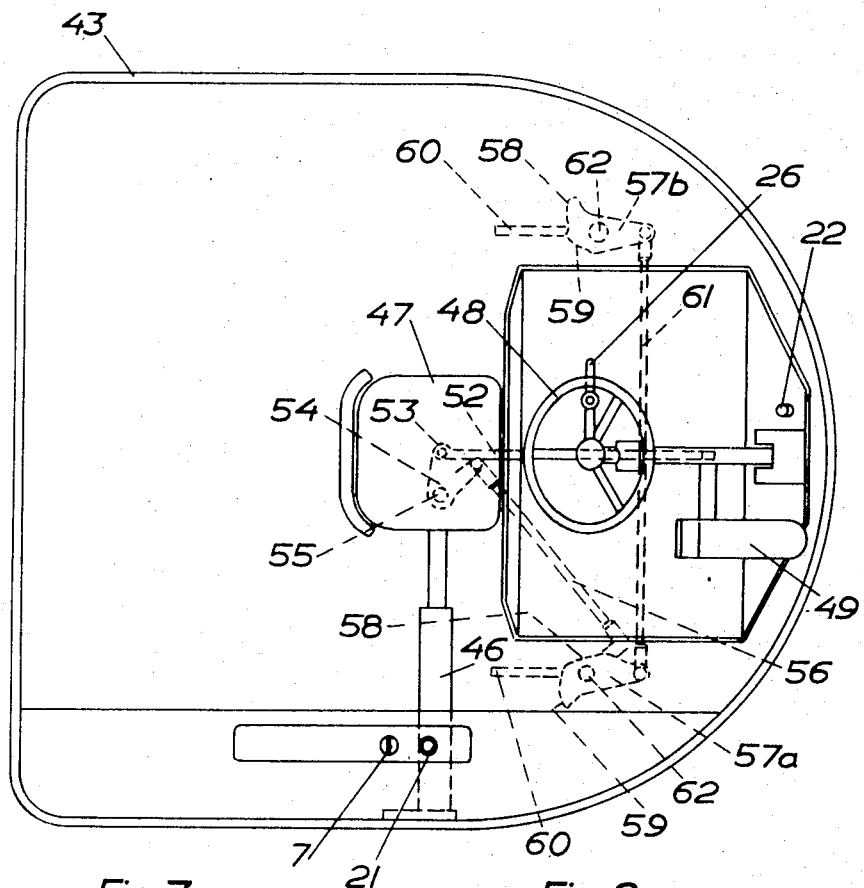
Fig.3
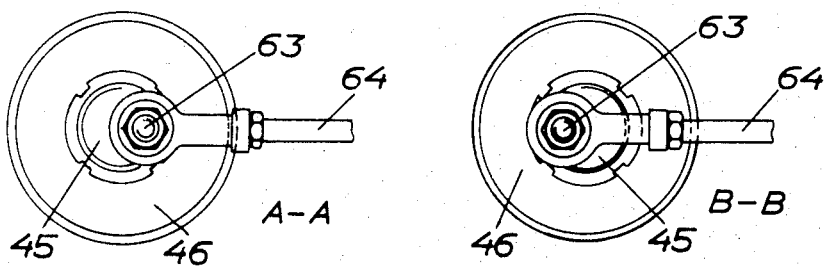
Fig.7   Fig.8
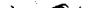
INVENTOR.
Nils Olof Sundberg Dec. 12, 1967      N. O. SUNDBERG      3,357,513
CONTROL MEANS FOR VEHICLES
Filed Sept. 23, 1965      9 Sheets-Sheet 5

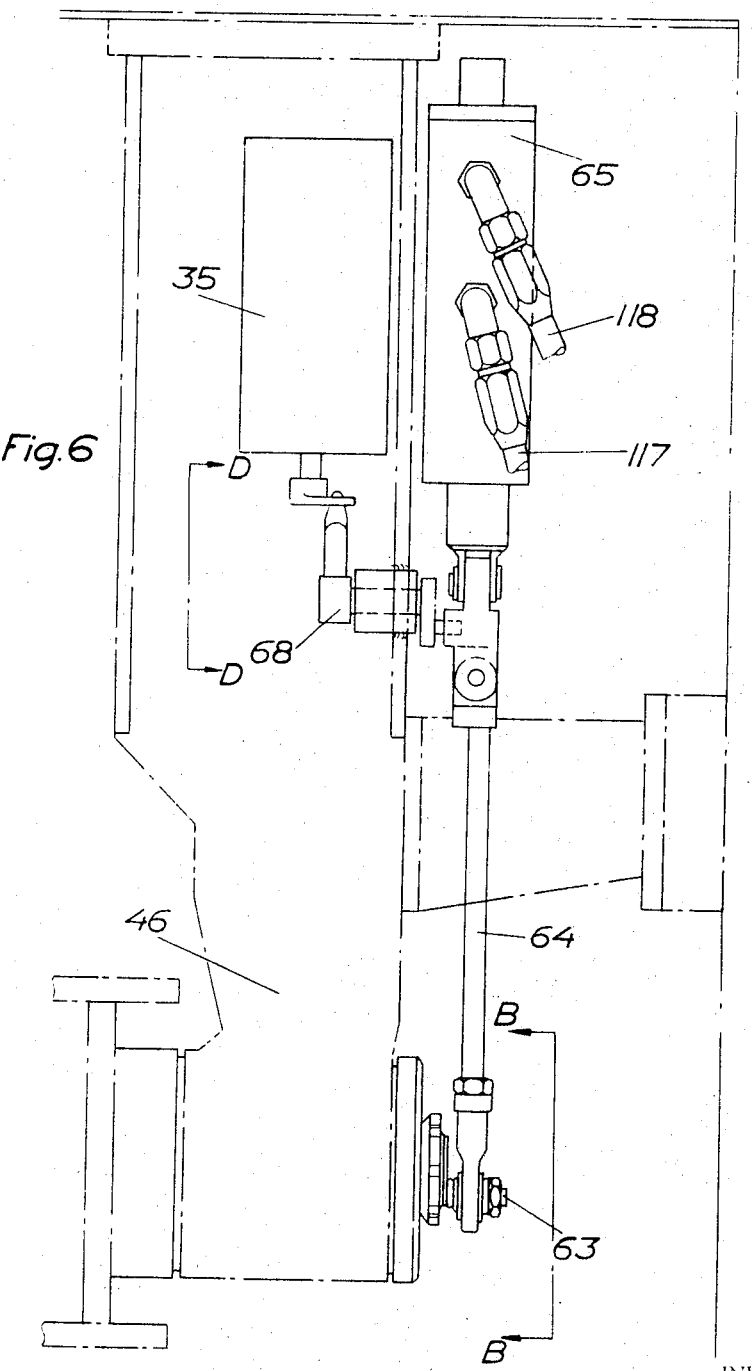

United States Patent Office 3,357,513
Patented Dec. 12, 1967

3,357,513
CONTROL MEANS FOR VEHICLES
Nils Olof Sundberg, Orebro, Sweden, assignor to Atlas Copco Aktiebolag, Nacka, Sweden, a corporation of Sweden
Filed Sept. 23, 1965, Ser. No. 489,701
Claims priority, application Sweden, Sept. 28, 1964, 11,650/64
5 Claims. (Cl. 180—77)

ABSTRACT OF THE DISCLOSURE

A control for vehicles, such as a vehicle of the two-wheeled type to which a two-wheeled container vehicle is pivotally coupled. The vehicle includes a seat carrier having a base on which the seat, steering wheel and operating controls are carried. The seat and associated parts can be faced forwardly or backwardly to enable the vehicle to be conveniently moved and operated in either direction by merely changing the seat to face in the required direction. The controls of the vehicle are so arranged and coupled to the seat that they are automatically shifted or reversed and solely by the rotative movement of the seat to enable them to be operated and the vehicle driven by the manipulation of such controls in the same way regardless of the direction in which the seat faces. Thus, the steering, transmission, power and lights of the vehicle will be adjusted for the same operation whether the vehicle faces forwardly or backwardly, the shift being made by seat change of direction.

---

Figure 1:
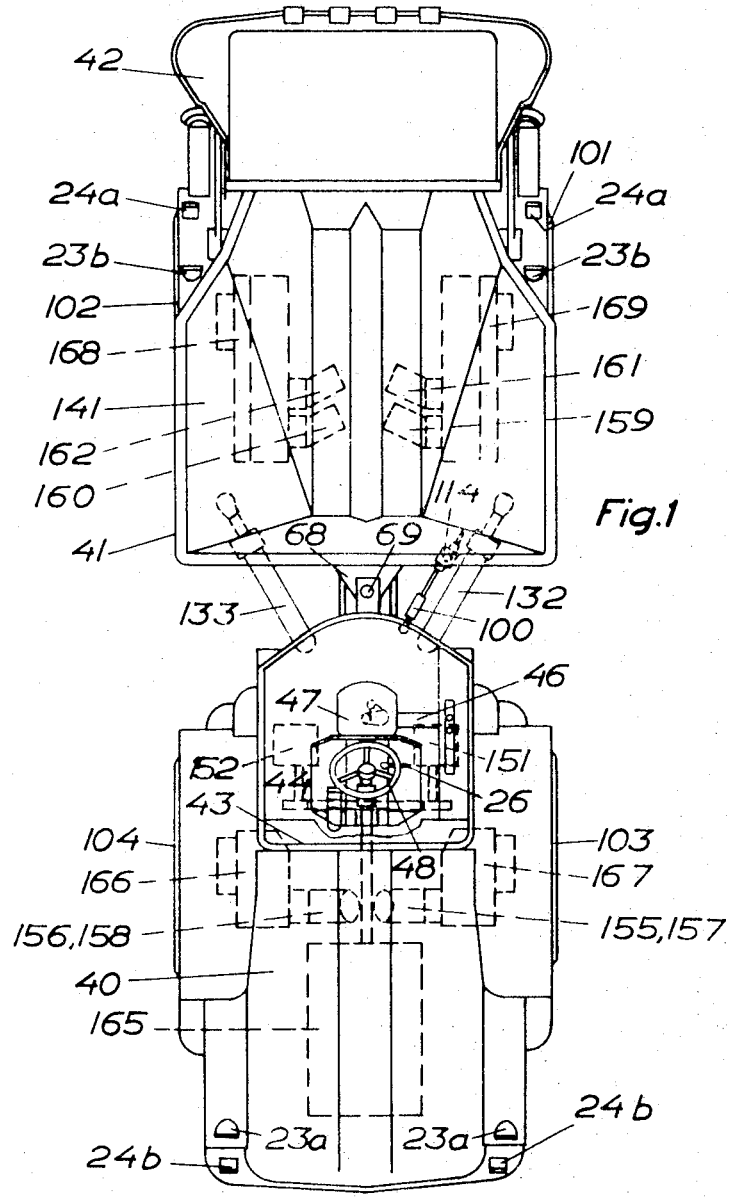

This invention relates to improvements in control means for vehicles having a driver's compartment provided with a seat, which may be swung from one first position facing forward for forward driving of the vehicle to a second position facing rearward for rearward driving of the vehicle and provided with a steering control member and a power control member, which are operable in the same sense relative to a driver on the seat in both positions of the seat for producing manoeuvres of the vehicle. One object of the invention is to avoid complicated mechanical arrangements for changing the controls of a vehicle for driving forwards with the driver facing forwards to a position for driving rearwards with the driver facing rearwards. A further object of the invention is to provide a reliable device which changes the controls automatically when the driver moves his seat from forward driving position to rearward driving position, or vice versa. For the above and other purposes the invention is substantially characterized by this that said power control member is reversible for controlling forward and rearward motion of the vehicle and that said control members are automatically changed from forward control position to rearward control position when the seat is swung from the first position to the second position, and vice versa.

In a preferred embodiment the vehicle is provided with hydraulic steering means and with a changeover valve which changes the sense of operation of the steering means when the driver's seat is swung from one first position to a second position facing the opposite direction. In the same preferred embodiment the traction wheels of the vehicle are operated by reversible hydraulic motors and the power control member is arranged to control the direction of fluid flow through the hydraulic system for causing said motors to move in one direction or the other.

In the accompanying drawings one embodiment of a control means for a vehicle according to the invention is illustrated by way of example. The illustrated control means is so arranged that when the driver's seat is in a first position in which the driver faces one first driving direction a left hand turn of the steering wheel results in a left hand turn of the vehicle, a right hand turn of the steering wheel results in a right hand turn of the vehicle, a forward tilting of the power control member causes the vehicle to move forwards and a rearward tilting of said power control member causes the vehicle to move rearwards, and furthermore head lamps are connected for throwing light in the direction in which the driver is facing and tail lamps are connected at the other end of the vehicle, and direction indicators such as blinkers or winkers are provided to indicate a left hand turn when an indicator lever is moved backwards and a right hand turn when said lever is moved forwards from the seated driver's position. When the driver's seat is revolved 180° all controls and lights and indicators are automatically switched over so that when the driver faces the new direction he can operate the vehicle by making movements in the same sense as before, i.e. a left hand turn of the steering wheel results in a left hand turn of the vehicle and so on, and furthermore he has now head lamps at the end facing the new direction and tail lamps at the other end and the direction indicators are also switched over so that a rearward movement of the indicator lever results in an indication of a left hand turn and a forward movement of the indicator lever results in an indication of a right hand turn of the vehicle.

Figure 2:
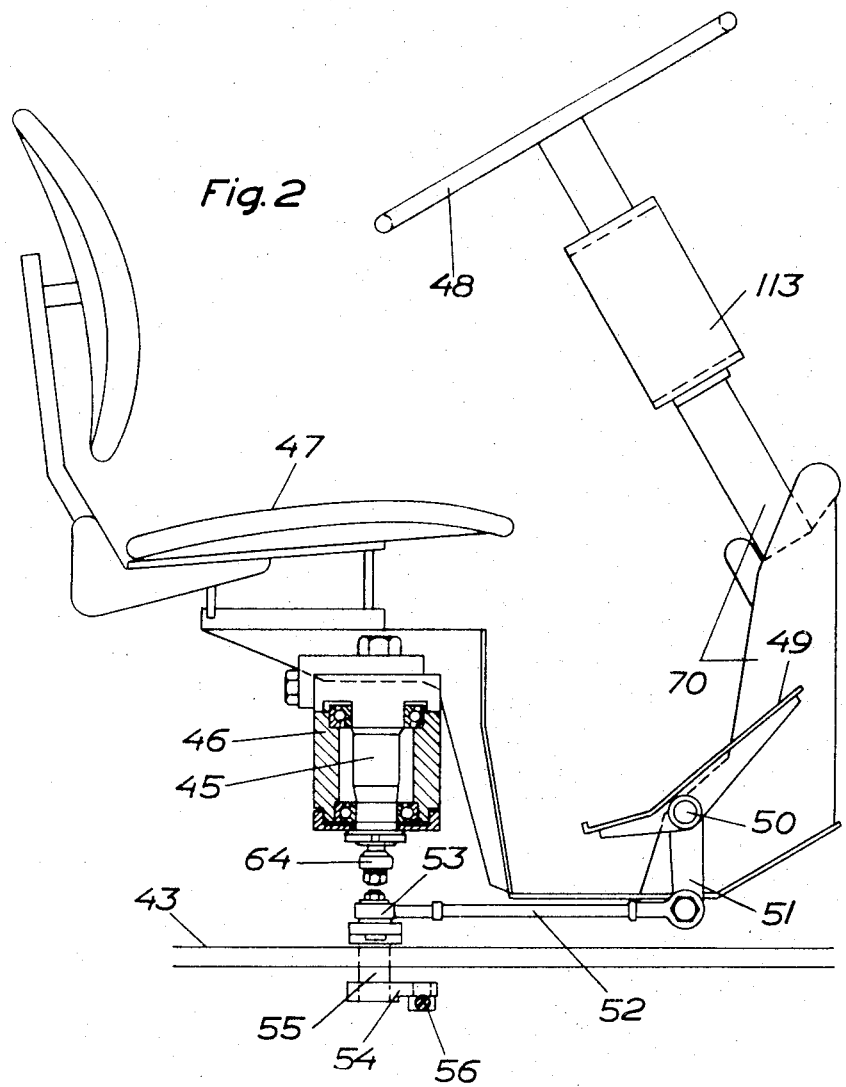
Figure 4:
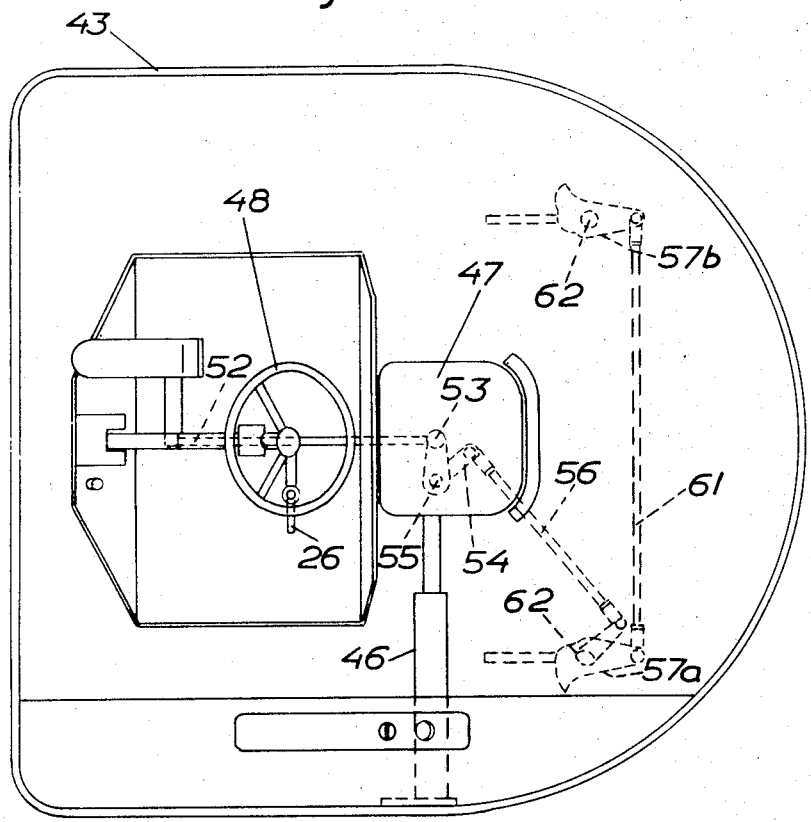
Figure 9:
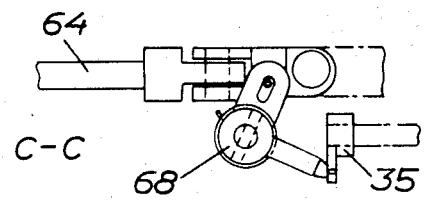
Figure 10:
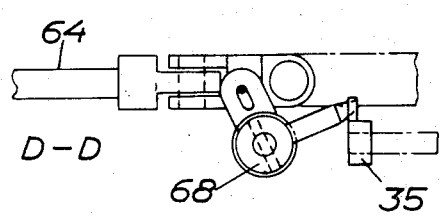
Figure 5:
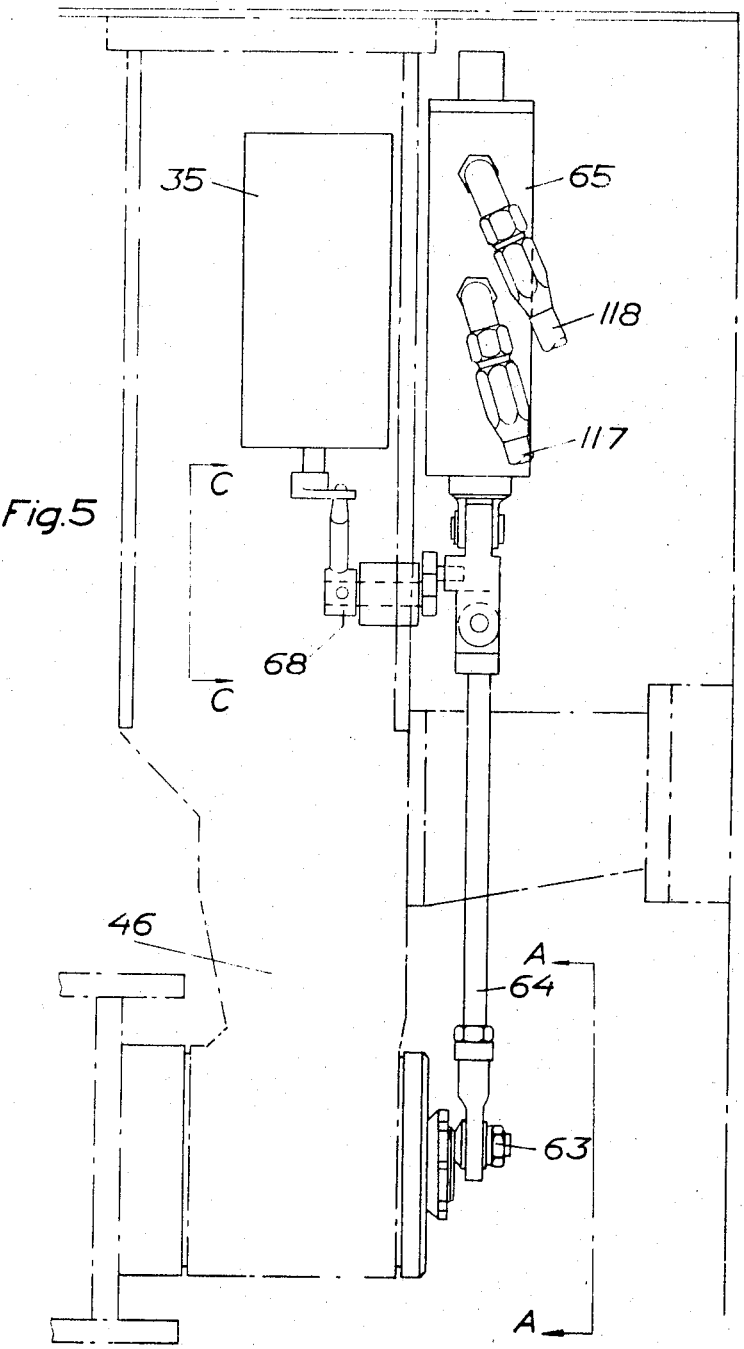
Figure 11:
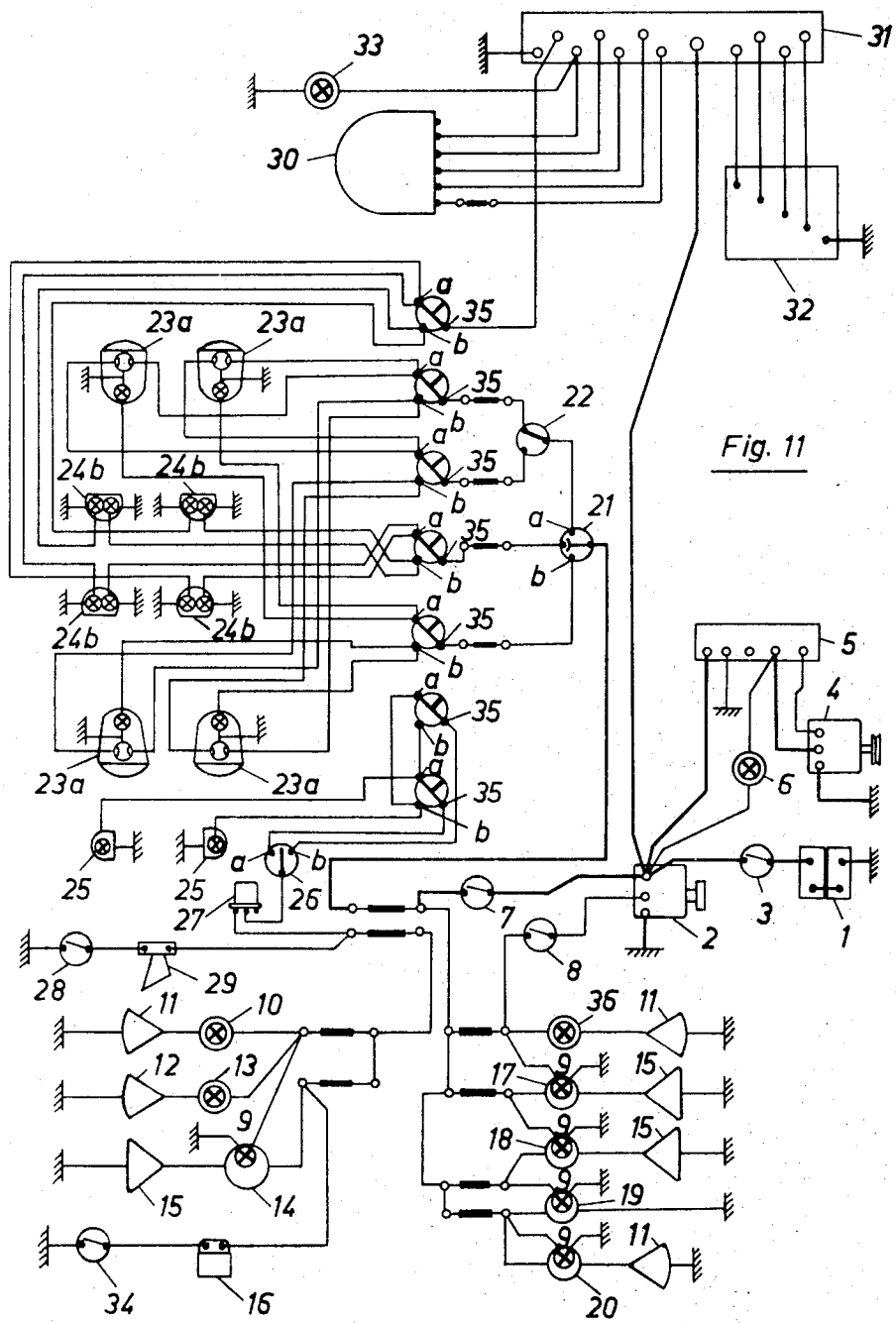

In the drawings, FIG. 1 is a plan view of a mine vehicle comprising a two-wheel motor unit and a two-wheel container unit. FIG. 2 is a side view on a larger scale and a partial longitudinal section of a portion of the driver's compartment showing the seat, the main operating members and a revolvable driver's platform. FIG. 3 is a plan view of the driver's compartment with the seat in position for driving to the right in the figure, and FIG. 4 illustrates the driver's compartment with the seat arranged for the driver facing the left in the figure. FIG. 5 is a transverse partially diagrammatic side view of the driver's compartment in the position of FIG. 3, and FIG. 6 is a similar view of the driver's compartment in the position of FIG. 4. FIGS. 7 and 8 are detail views taken from below the driver's seat on the lines A—A in FIG. 5 and B—B in FIG. 6, respectively, and FIGS. 9 and 10 are horizontal detail views taken on lines C—C and D—D of details in FIGS. 5 and 6, respectively. FIG. 11 is a wiring diagram for the vehicle and FIGS. 12a, 12b, and 12c are diagrams showing the hydraulic circuits of the vehicle.

The control means according to the invention is illustrated in connection with a mine vehicle which is shown in plan view in FIG. 1 and comprises a two-wheel motor unit 40 which carries an internal combustion engine 165 and a number of hydraulic pumps driven thereby and a two-wheel container unit 41 which is provided with a container 141 and a hydraulically operated digging and loading shovel 42. The motor unit 40 and the container unit 41 are pivotally connected by means of a hinge joint 68 which includes a vertical pivot 69 and also a horizontal longitudinal pivot which is not illustrated. The hinge joint 68 permits the motor unit 40 to be turned relative to the container unit 41 for steering purposes and it also permits the two units to be twisted on a longitudinal axis within a certain angle relative to each other in order to comply with uneven ground conditions. The illustrated vehicle is driven by hydraulic motors operating four traction wheels 101, 102, 103, 104 of the vehicle. The hydraulic system for operating the traction wheels and various hydraulic cylinders on the vehicle do not form a part of this invention and are described here only in order to make the understanding of the control means easier. The hydraulic conduits such as hoses and pipes which connect the various hydraulic elements are not shown in FIGS. 1–11 since they would only make the drawing obscure.

Figure 12A:
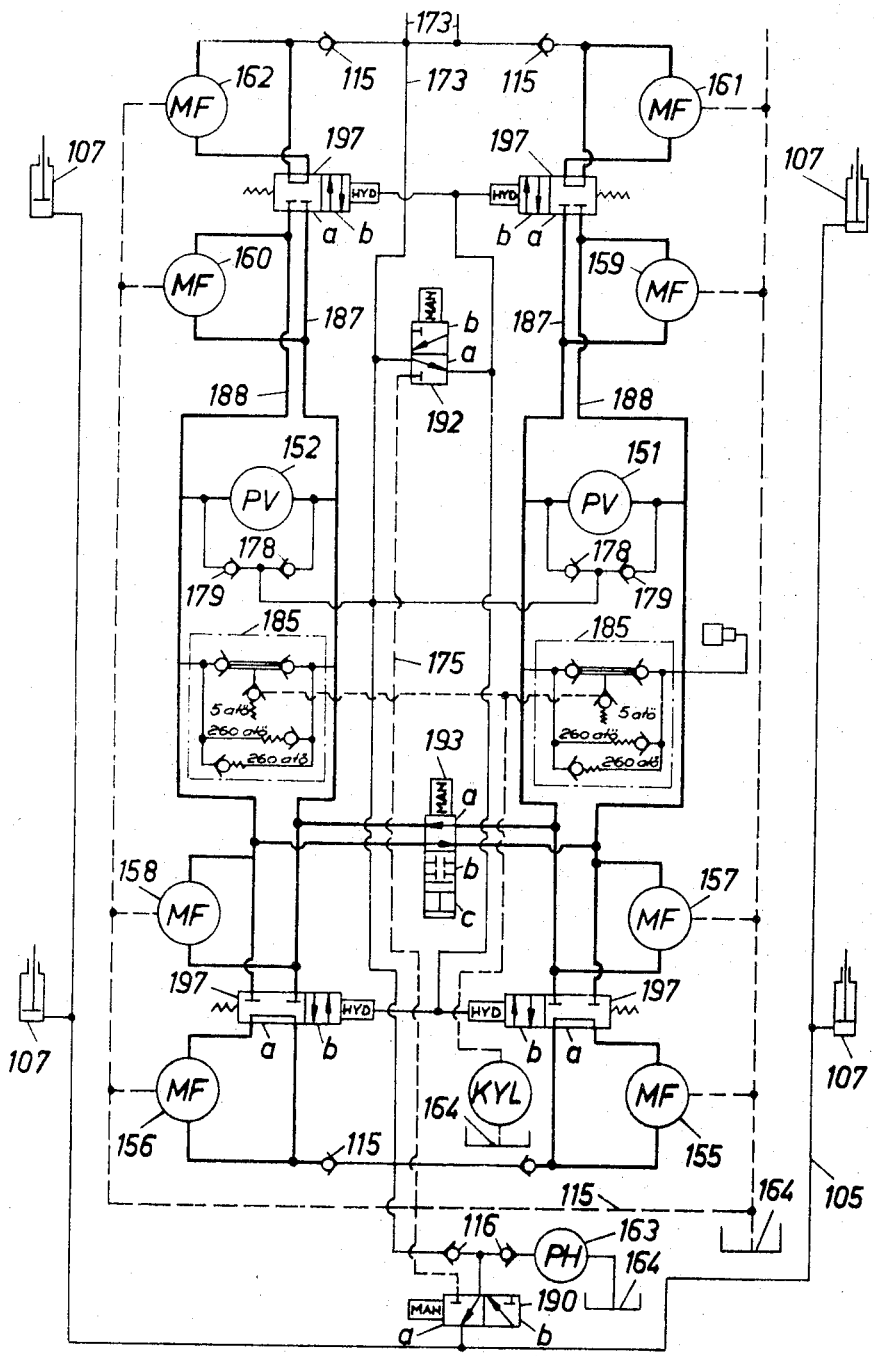
Figure 12B:
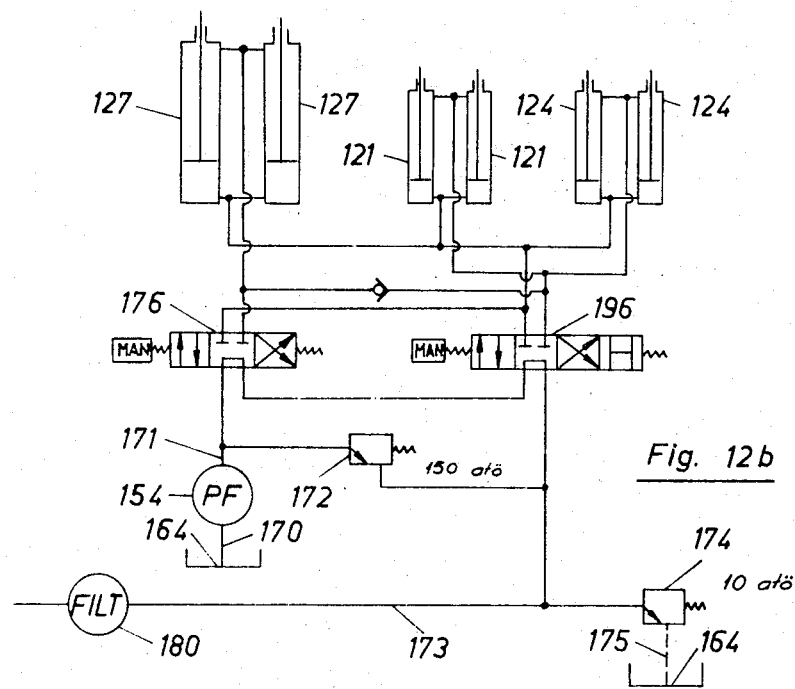
Figure 12C:
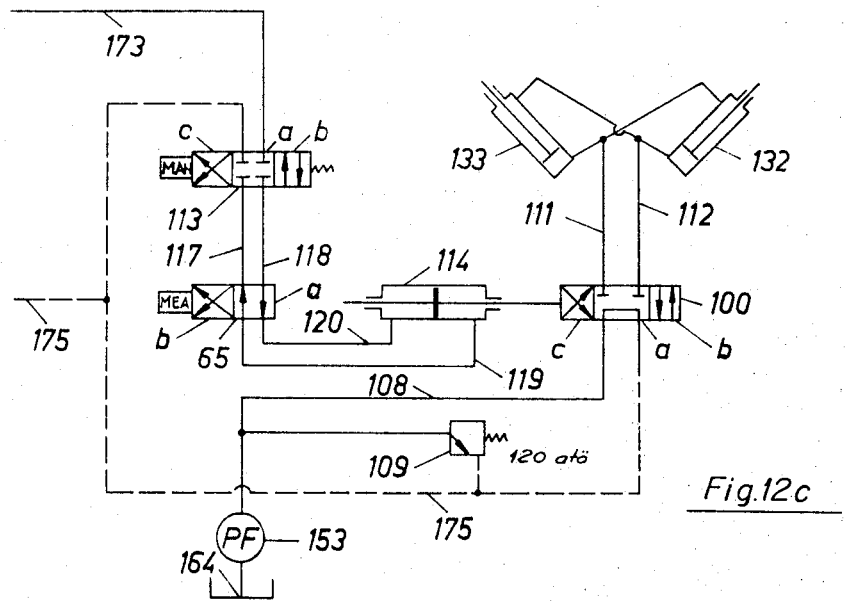

In FIGS. 12a and b, 151 and 152 indicate two hydraulic pumps with variable capacity and reversible direction of hydraulic fluid delivery which pumps may, for instance, be of the type sold under the trademark Hydrostabil by AG Lindes Eisenmaschinen, Wiesbaden, Germany, and two hydraulic pumps 153, 154 which may be hydraulic gear pumps. The pumps 151, 152 deliver pressure liquid to eight wheel motors 155–162 which are conventional hydraulic motors which may be operated forward and reverse according to the supply of pressure liquid to the motors in one direction or the other, and which may be gear motors, sliding vane motors, or other types of motors. Two motors are provided for driving each of the four traction wheels 101–104 of the motor unit 40 and the container unit 41. Each motor operates the pertaining wheel through a suitable gear transmission 166, 167, 168, 169 arranged immediately adjacent the pertaining wheel. 163 is a hydraulic hand pump and 164 indicates a hydraulic liquid container which is common for all the devices illustrated on the hydraulic circuit diagram. Return fluid from the various motors as well as leakage fluid from the motors and hydraulic cylinders is conveyed to the container 164. The variable flow capacity and variable flow direction hydraulic pumps 151 and 152 as well as the non-variable hydraulic pumps 153 and 154 are driven by an internal combustion engine 165 on the motor unit 40. Said engine may be a diesel engine or other internal combustion engine or an electric motor or other motor.

As soon as the engine has been started all hydraulic pumps 151–154 are operated. The pump 154 draws liquid from the container 164 and supplies pressure liquid to cylinders 127, 121 and 124 which are provided for dumping the container 141 and operating the shovel 42. The pump 154 draws liquid from the container 164 through a conduit 170 and delivers pressure liquid to a conduit 171 which is connected to manually operated valves 176 and 196 and pressure reduction valves 172 and 174. The valve 172 may be set for 150 kilograms/square cm. and the valve 174 for 10 kilograms/square cm. If no pressure liquid is consumed in the whole system the superfluous liquid flows through the pressure reduction valve 174 and a return conduit 175 to the container 164. 173 is a feed conduit which over a filter 180 provides feeding liquid to the pumps 151 and 152, said feeding liquid being of 5 kilograms/square cm. and being provided to the suction side of the pumps as well as for manoeuvring purposes for hydraulically operated valves and brakes.

A manually operable valve 192, which is a speed change valve, supplies in the position a pressure liquid from the pump 154 through the conduit 173 for hydraulic operation of four valves 197 so that said valves may be moved from a position a to a position b. In the position a of the valves 197 one wheel motor 155, 156, 161, 162 at each wheel is short circuited and consequently unoperated whereas pressure liquid is supplied from the pumps 151, 152 to the four other wheel motors 157, 158, 159 and 160. At unchanged pressure liquid delivery from the pumps 151, 152 the traction wheels will consequently in the position a of the valves 197 be driven with high speed. In the position b of the valves 197 on the contrary each pair of wheel motors are coupled in parallel and at unchanged delivery quantity from the pumps 151, 152 the wheel motors will consequently be driven with half the speed as compared with the speed obtained in the position a. The torque and driving power, however, will be doubled if the pressure is unchanged, and will be still more if the pressure is increased.

The pumps 151, 152 are conventional hydraulic pumps with adjustable capacity and capable of being set for delivery of pressure liquid in one direction or the other from the pumps. According to the adjustment of the pumps they deliver pressure liquid through the conduits 187 or 188 for driving the hydraulic motors forward or reverse, respectively. A manually operated valve 193 operates as a differential for the vehicle and in the position b of said valve as a differential interlock whereas in the position c the motors are short circuited so that the vehicle may be towed. In the position a the valve 193 connects the conduits 187, 187 and 188, 188 for equalizing the fluid flow to the motors on each side of the vehicle. In the position b the valve 193 separates the left hand side motors from the right hand side motors, and in the position c the motors are short-circuited and the pump outlets connected to the pump inlets so that the vehicle can be towed. A valve device 185 is an over-load and chock protection device for the hydraulic conduit system. The hand pump 163 is provided for delivery pressure fluid over a valve 190 to a conduit 105 which is connected to wheel brake cylinders 107. In the position a of the valve 190 the wheel brakes are released but when the valve 190 is operated, for instance by a foot pedal, to the position b the brakes are applied by not illustrated springs. 115 and 116 and 178 and 179 are check valves.

In order to be able to steer the vehicle by means of a steering wheel 48 the pump 153 supplies pressure liquid of 120 kg./cm.² to steering cylinder means 132, 133. The pump 153 is therefore connected to a steering cylinder control or manoeuvring valve 100 and the pump pressure is controlled by a pressure regulating valve 109. The pressure regulating valve is connected in parallel with a conduit 108 which connects the pump 153 with the valve 100. The valve 100 has three positions a, b and c. The position a is a closed neutral position, the position b provides two straight through passages, and the position c two crossed passages. The valve 100 is hydraulically operated from the steering wheel 48 which controls a valve 113 which can take three positions a, b and c and has a spring bias which tends to move it to position a. The spring holds the valve 113 in a closed neutral position a as soon as the steering wheel 48 is at rest but when the steering wheel is turning for instance to the left valve 113 takes position b, and when it is turning right valve 113 takes position c. From the valve 113 two conduits 117, 118 lead to a change-over valve 65 and said valve is connected through conduits 119, 120 with an operating cylinder 114 for the valve 100. The valve 100 has a position b for turning of the vehicle one way and a position c for turning the opposite way. In the position a the steering cylinders are locked. The valve 100 is pivotally connected to one unit 40 and the cylinder 114 is pivotally connected to the other unit 41. When the driver's seat is, for instance, in the position of FIG. 3, the steering wheel 48 may be turned, for instance, for making a left turn so that the valve 113 is moved to the position b and the valve 100 is then hydraulically moved to the position c, and when the steering wheel 48 is turned to the right the valve 113 may be moved to the position c and the valve 100 to the position b so that pressure liquid from the pumps 153 is supplied to the steering cylinders 132 and 133 through conduit 111 for a right turn and simultaneously liquid is exhausted from the opposite sides of the cylinders 132, 133 through the conduit 112. When the unit 41 turns relative unit 40 by the action of steering cylinders 132, 133 the valve 100 is automatically returned to neutral position a as soon as the steering wheel is at rest in any turned position, since turning of one unit with valve 113 in position a automatically moves 100 to position a. This would be obvious from the fact that when 114 is locked in a position which admits fluid to the steering cylinders the turning of the units 40, 41 causes the valve to go back to position a very soon. When the vehicle is operated with the driver's seat in the position of FIG. 4 the valve 65 is moved from the position a to the position b so that the conduits 117, 118 and 119, 120 are crossed.

The motor unit 40 carries a driver's compartment 43 and on the driver's compartment a platform 44 is rotatable on a vertical shaft 45 which is mounted in bearings carried by a supporting structure 46 in the driver's compartment. The platform 44 carries a driver's seat 47 and the steering wheel 48 for steering of the vehicle as well as an operating pedal 49 for operation of the control means of the hydraulic pumps 151, 152 for delivery of pressure liquid to the hydraulic wheel motors 155–162 and for operation of the vehicle forward or reverse. The pedal 49 is swingable on an axle 50 carried by a steering wheel support 70 on the platform 44 and has an arm 51 which by means of a connecting rod 52 and a ball joint 53 is connected to a bell crank lever 54 which is mounted on a shaft 55 journalled in the driver's compartment. When the pedal 49 is uninfluenced the ball joint 53 is in the elongation of the axis of the shaft 45. The bell crank lever 54 is connected through a link 56 with cam members 57a and 57b which have a cam surface 58 for operation forward and a cam surface 59 for operation rearward and which control the hydraulic pumps 151, 152. 60 indicates the control members of the hydraulic pumps which are forced to follow the cam surfaces 58, 59, respectively.

In the illustrated embodiment in which the vehicle is provided with two hydraulic pumps 151, 152 a connecting rod 61 is provided which connects the cam member 57a of one hydraulic pump with the cam member 57b of the second hydraulic pump. The cam members 57a, 57b are swingable on pivots 62 carried by the driver's compartment. A crank pin 63 is secured at the bottom end of the shaft 45 offset to the axis of the shaft 45 as obvious from FIGS. 7 and 8 and said crank pin carries a connecting rod 64 which connects the crank pin with the change-over valve 65, FIGS. 5, 6 and 12b.

As mentioned before the steering wheel 48 controls a valve 113 and turning of the steering wheel moves said valve from the position a to any of the positions b and c, FIG. 12b. The valve 113 controls the fluid flow through the conduits 117 and 118 which are connected to the change-over valve 65. The arrangement is such that a left hand turn of the steering wheel in the position illustrated in FIG. 3 and looking forward from the driver's seat results in a left hand turn of the vehicle and also a left hand turn of the steering wheel looking in opposite direction from the driver's seat in FIG. 4 gives the vehicle a left hand turn, and on the contrary a right hand turn of the steering wheel in any position of the driver's seat gives a right hand turn of the vehicle. This is due to the fact that a movement of the driver's seat from the position in FIG. 3 to the position in FIG. 4 moves the crank pin 63 from the position in FIG. 7 to the position in FIG. 8 and consequently moves the valve 65 from the position a to the position b in which the conduits 117, 118 and 119, 120 are crossed. The connecting rod 64 is furthermore connected to a link mechanism 68 which is connected to a change-over switch 35 in such a manner that said change-over switch upon swinging of the driver's seat from the position in FIG. 3 to the position in FIG. 4 is switched over from the position 35a to the position 35b in the wiring diagram illustrated in FIG. 11.

In said wiring diagram 1 indicates a battery of the vehicle, 2 a startermotor, 3 a main switch, 4 a generator, 5 a charging governor, and 6 a charging control lamp. 7 is an operating switch and 8 a starter button. 9 indicates instrument panel lights and 10 a control lamp for an oil pressure gauge 11 for the lubricating oil. 12 is a pressure control and 13 is a control lamp for the cooling water temperature 14 is a fuel level indicator and 15 a hydraulic liquid level indicator. 16 is an electromagnetic valve, 17 is a hydraulic tank gauge and 18 a water tank gauge. 19 is a time indicator and 20 a hydraulic liquid temperature indicator. 21 is a switch for the connection of head lights and parking lights and 22 is a switch for changing from full light to blended light. 23a indicates the head lights at one end of the vehicle and 24a the tail and stop lights at the opposite end. 23b indicates the head lights at the other end of the vehicle and 24b the tail and stop lights at the opposite end, i.e. at the end of the vehicle where the head lights 23a are arranged. 25 indicates blinker lights and 26 is a control switch for the blinkers and 27 is the blinker relay. 28 is a signal button and 29 a horn. A brake regulator is indicated at 30 and a connection box at 31. 32 is a switch box for a four-step brake and 33 is a brake control lamp. 34 is a pedal switch and 35 indicates the change-over switch which is also illustrated in FIGS. 5 and 6 and which is moved from the position a to the position b when the driver's seat 47 is turned through 180° from the position illustrated in FIG. 3 to the position illustrated in FIG. 4. It would be obvious from the above described wiring diagram and from the description that when the driver's seat is moved from the position illustrated in FIG. 3 to the position illustrated in FIG. 4 the change-over switch 35 is moved from the position a to the position b and that thereby the head lights 23a and tail lights 24a are disconnected and that instead the head lights 23b and the tail lights 24b are connected. It would also be obvious that the blinker connections are changed so that operation of the blinker switch always gives the normal indication.

The evhicle above described and the control means for said vehicle should only be considered as an example and may be modified in several different ways within the scope of the following claims.

What I claim is:

1. Control means for vehicles having a driver's compartment provided with a seat mounted to enable it to be swung from a first forwardly facing position to a second rearwardly facing position, a steering control member and a power control member operable in the same way in relation to a driver on the seat in both positions of the seat for the operation of the vehicle, said power control member being reversible for controlling forward or rearward movement of the vehicle, means by which said control members become automatically changed from forward control position to rearward control position by movements of the seat from the forwardly facing position to the rearwardly facing position and vice versa, the steering control member being rotatable on a steering post and being coupled to a control valve means, a cylinder means into which fluid pressure is directed by the control valve, means for the expansion of the cylinder means upon the turning of the steering control in one first direction and for the contraction of the cylinder means in a second direction, a change-over valve provided between the control valve means and the cylinder means and which valve is controlled by movements of the seat and which automatically shifts the direction of fluid flow to and from said cylinder means upon turning of the seat from said first position to said second position.

2. Control means according to claim 1, in which the power control member is a lever, a connecting rod and a ball joint connected to the lever and coupled to a bell crank lever, said lever being linked to a cam operating a control rod of a reversible variable delivery hydraulic pump so as to direct hydraulic fluid to hydraulic wheel motors for operation in a first direction and a second direction upon turning of the cam for pump fluid delivery in a first direction or a second direction, respectively, said connecting rod being swingable on said ball joint through 180° when the seat is swung from said first driving position to the second driving position.

3. Control means according to claim 1, in which the vehicle is provided with a change-over switch, which upon turning of the driver's seat from a first position to a second position switches over current from lamps such as head lights and tail lights for driving in a first direction to lamps for driving in the second direction.

4. Control means according to claim 1, in which the vehicle is provided with a change-over switch which is operated by turning of the driver's seat from a first position to a second position and automatically switches over the cables to direction indicators, a control member for the indicators being moved in a first sense relative to the driver's seat to give indication of left turn and in a second sense relative to said seat to give indication of a right turn irrespective of the position of said seat.

5. Control means for vehicles having a driver's compartment provided with a seat mounted to enable it to be swung from a forwardly facing position to a rearwardly facing position, a steering control member and a power control member operable in the same way in relation to a driver on the seat in both positions of the seat for operation of the vehicle, said power control member being reversible for controlling forward or rearward movement of the vehicle, means by which said control members become automatically changed from forward control position to rearward control position by movements of the seat from one of its position to the other, the driver's seat being munted on a rotatable vertical shaft, a supporting structure having bearings in which said shaft is carried, an eccentric on the shaft, a connecting rod operable by said eccentric to move longitudinally in response to the turning of the shaft and its eccentric, from one position to a second 180° position, hydraulic cylinder means for effecting swinging of a portion of the vehicle relative to another portion thereof, fluid conduits leading to the cylinder means, a change-over valve for the fluid conduits, means connected to the connecting rod and operable thereby from the first position to a second position in which the hydraulic conduits to the cylinder means are crossed in respect to their arrangement when in the first position.

References Cited

UNITED STATES PATENTS

| | | | |
|---|---|---|---|
| 2,384,890 | 9/1945 | Coldwell | 180—77 |
| 3,132,486 | 5/1964 | Jonkers | 180—77 |
| 3,134,454 | 5/1964 | Jonkers | 180—77 |
| 3,272,280 | 9/1966 | Schuetz | 180—77 |

KENNETH H. BETTS, *Primary Examiner.*